US012629892B2

(12) United States Patent
Stekli et al.

(10) Patent No.: US 12,629,892 B2
(45) Date of Patent: May 19, 2026

(54) SYSTEMS, DEVICES, AND METHODS FOR GENERATING A LATTICE SUPPORT STRUCTURE OUTSIDE OF AN EXCLUSION AREA

(71) Applicant: GENERAL ELECTRIC COMPANY, Schenectady, NY (US)

(72) Inventors: Justin Stekli, Dayton, OH (US); Bathrinarayanan Mukundan, Bengaluru (IN); Ryan Christopher Jones, Evendale, OH (US); Paul C. Schilling, West Chester, OH (US)

(73) Assignee: General Electric Company, Evendale, OH (US)

( * ) Notice: Subject to any disclaimer, the term of this patent is extended or adjusted under 35 U.S.C. 154(b) by 504 days.

(21) Appl. No.: 17/234,277

(22) Filed: Apr. 19, 2021

(65) Prior Publication Data

US 2022/0332050 A1    Oct. 20, 2022

(51) Int. Cl.
*B29C 64/386*    (2017.01)
*B33Y 50/00*    (2015.01)
(Continued)

(52) U.S. Cl.
CPC ............ *B29C 64/386* (2017.08); *B33Y 50/00* (2014.12); *G05B 19/4099* (2013.01);
(Continued)

(58) Field of Classification Search
CPC ....... B29C 64/386; B33Y 50/00; G06F 30/10; G06F 2113/10; G05B 19/4099; G05B 2219/35134; G05B 2219/49023
See application file for complete search history.

(56) References Cited

U.S. PATENT DOCUMENTS 9,470,095 B2    10/2016   Propheter-Hinckley et al.
9,579,714 B1    2/2017    Rutkowski
(Continued)

FOREIGN PATENT DOCUMENTS

CN    105745652 A    7/2016
CN    111546628 A    8/2020
(Continued)

OTHER PUBLICATIONS

Wadea Ameen et al "Manufacturability of Overhanging Holes Using Electron Beam Melting" , Metals, vol. 8, No. 6, May 30, 2018, pp. 1-24, XP055736680, DOI: 10.3390/met8060397.
(Continued)

*Primary Examiner* — Darrin D Dunn
*Assistant Examiner* — Yvonne Trang Follansbee
(74) *Attorney, Agent, or Firm* — Dinsmore & Shohl LLP

(57)    ABSTRACT

A printing device receives modeling data that defines a three-dimensional solid model of a component body having a plurality of faces and a plurality of edges. Each of the faces meets another face of the component body at a respective edge of the component body. The printing device interrogates one or more faces of the component body to identify one or more looped geometries, and defines a lattice exclusion area having a boundary formed based at least in part on one or more faces of the component body that correspond to the looped geometries. The printing device generates a printer output of the component body and a lattice support structure for the component body. The printer output of the lattice support structure is outside of the lattice exclusion area.

14 Claims, 17 Drawing Sheets

(51) Int. Cl.

| | |
|---|---|
| *G05B 19/4099* | (2006.01) |
| *G06F 30/10* | (2020.01) |
| *G06F 113/10* | (2020.01) |

(52) U.S. Cl.
CPC .... *G06F 30/10* (2020.01); *G05B 2219/35134* (2013.01); *G05B 2219/49023* (2013.01); *G06F 2113/10* (2020.01)

(56) References Cited

U.S. PATENT DOCUMENTS

| | | | | |
|---|---|---|---|---|
| 9,817,388 | B2 * | 11/2017 | Kumar | ..................... G06T 19/20 |
| 9,982,544 | B2 | 5/2018 | Xu | |
| 10,018,052 | B2 | 7/2018 | Snyder et al. | |
| 11,167,481 | B2 * | 11/2021 | Ulichney | .............. B29C 64/393 |
| 2016/0159465 | A1 | 6/2016 | Koppelman et al. | |
| 2017/0113413 | A1 | 4/2017 | Iwase et al. | |
| 2017/0277168 | A1 | 9/2017 | Tanaka et al. | |
| 2018/0243097 | A1 | 8/2018 | Jones et al. | |
| 2018/0347442 | A1 | 12/2018 | Lacy et al. | |
| 2019/0106993 | A1 | 4/2019 | Burd | |
| 2020/0004225 | A1 * | 1/2020 | Buller | ................... B29C 64/393 |
| 2022/0244704 | A1 * | 8/2022 | Chu | ......................... A61F 13/38 |

FOREIGN PATENT DOCUMENTS

| | | |
|---|---|---|
| CN | 112520068 A | 3/2021 |
| JP | 2017170764 A | 9/2017 |
| JP | 2021031053 A | 3/2021 |

OTHER PUBLICATIONS

Mulherin Kristin: "Metal 3D Printing: Who Needs Supports?" , Feb. 11, 2021, XP093019424, Retrieved from the Internet: URL:https://www.machinedesign.com/3d-printing-cad/article/21154652/ metal-3d-printing-who-needs-supports.

Ahmed Hussein et al "Advanced lattice support structures for metal additive manufacturing" , Journal of Materials Processing Technology, vol. 213, No. 7, Jul. 1, 2013, pp. 1019-1026, XP055295573, NL ISSN: 0924-0136, DOI: 10.1016/j.jmatprotec.2013.01 .020.

Hase Vaibhav Jet al: "Complex Hole Recognition from CAD Mesh Models" , Sep. 29, 2018, pp. 515-534, XP093019438, ISBN: 978-93-877-9346-0 Retrieved from the Internet: URL:https://www.cctech.co.in/downloads/publications/2018/complex-holerecognition-from-cad-mesh-models-ICETSET-2018.pdf.

Extended European Search Report for Application No. 22164721.7 dated Feb. 14, 2023 (12 pages).

Japanese Patent Office Action for Application No. 2022-068958 dated Jul. 25, 2023 (5 pages with English Translation).

Chinese Office Action for Application No. 202210406256.7 dated Jan. 26, 2024 (20 pages with English Translation).

* cited by examiner

*400*

START

RECEIVE
MODELING DATA  *402*

INTERROGATE TO IDENTIFY
CYLINDRICAL FACES  *404*

DEFINE EXCLUSION AREA
BASED ON CYLINDRICAL
FACES  *406*

GENERATE
PRINTER OUTPUT  *408*

END

900

950

960

1300

1302

1052

1312

1500

START

RECEIVE
MODELING DATA — 1502

INTERROGATE TO IDENTIFY
LOOPED GEOMETRIES — 1504

DEFINE EXCLUSION
AREA BASED ON
LOOPED GEOMETRIES — 1506

GENERATE
PRINTER OUTPUT — 1508

END

SYSTEMS, DEVICES, AND METHODS FOR GENERATING A LATTICE SUPPORT STRUCTURE OUTSIDE OF AN EXCLUSION AREA

FIELD

The present disclosure generally relates to systems and methods for generating a printing output for a component.

BACKGROUND

Recent advances in three-dimensional (3D) printing have led to widespread use of 3D printing in the production and manufacture of goods. For instance, a 3D printer may be used to generate a printer output of a component such as an air-oil separator or a heat exchanger, among numerous other examples. Though multiple techniques exist for 3D printing, most involve adding successive layers of material to reproduce a component that was originally modeled using a computer-aided design (CAD) program.

SUMMARY

In an embodiment, a method carried out by a printing device includes receiving modeling data that defines a three-dimensional solid model of a component body having a plurality of faces and a plurality of edges. Each of the faces meets another face of the component body at a respective edge of the component body. The method further includes interrogating one or more faces of the component body to identify one or more looped geometries, and defining a lattice exclusion area having a boundary formed based at least in part on one or more faces of the component body that correspond to the looped geometries. Additionally, the method includes generating a printer output of the component body and a lattice support structure for the component body. The printer output of the lattice support structure is outside of the lattice exclusion area.

In an embodiment, a method carried out by a printing device includes receiving modeling data that defines a three-dimensional solid model of a component body having a plurality of faces and a plurality of edges. Each of the faces meets another face of the component body at a respective edge of the component body. The method further includes interrogating one or more faces of the component body to identify one or more loops. Each of the loops comprises one or more respective edges of the component body. Additionally, the method includes identifying one or more faces of the component body that correspond to the identified loops, and defining a lattice exclusion area having a boundary formed based at least in part on the identified corresponding faces. Also, the method includes generating a printer output of the component body and a lattice support structure for the component body. The printer output of the lattice support structure is outside of the lattice exclusion area.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

To provide additional structural support to a printed component, a 3D printer may generate a lattice support structure for the component. Such a support structure could take the form of a tiling of a lattice unit cell, potentially resulting in a 3D honeycomb or other lattice-like structure. To generate the lattice support structure, the 3D printer (or a printing device communicatively connected to the 3D printer) may be provided with a solid model of the lattice unit cell along with an output boundary within which the lattice unit cell is to be tiled or copied so as to generate the support structure. The 3D printer may then generate a printer output (e.g., a physical output (i.e., a printed article) or a data output, such as a print job according to a page description language (PDL)) of the component along with the lattice support structure.

However, there may exist areas within the output boundary where the tiling of the lattice unit cell should not occur. For instance, generating the lattice support structure within an air passageway of the component could result in obstructed air flow and impaired temperature control of the component.

Printing systems, printing devices, and methods for generating a printer output of a lattice support structure outside of a lattice exclusion area are disclosed herein. In some embodiments, a printing device receives modeling data that defines a three-dimensional solid model of a component body having a plurality of faces and a plurality of edges. Each of the faces meeting another face of the component body at a respective edge of the component body. The printing device interrogates one or more faces of the component body to identify one or more looped geometries, and defines a lattice exclusion area having a boundary formed based at least in part on one or more faces of the component body that correspond to the looped geometries. The printing device generates a printer output of the component body and a lattice support structure for the component body. The printer output of the lattice support structure is outside of the lattice exclusion area. By generating a printer output of a lattice support structure that is outside of the lattice exclusion area, it may be possible to prevent the lattice support structure from blocking areas, formed by the looped geometries, that may be intended to remain clear of obstructions. Various embodiments of printing systems, printing devices, and methods for generating a printer output of a lattice support structure outside of a lattice exclusion area will now be described in detail with reference to the drawings.

Figure 1:
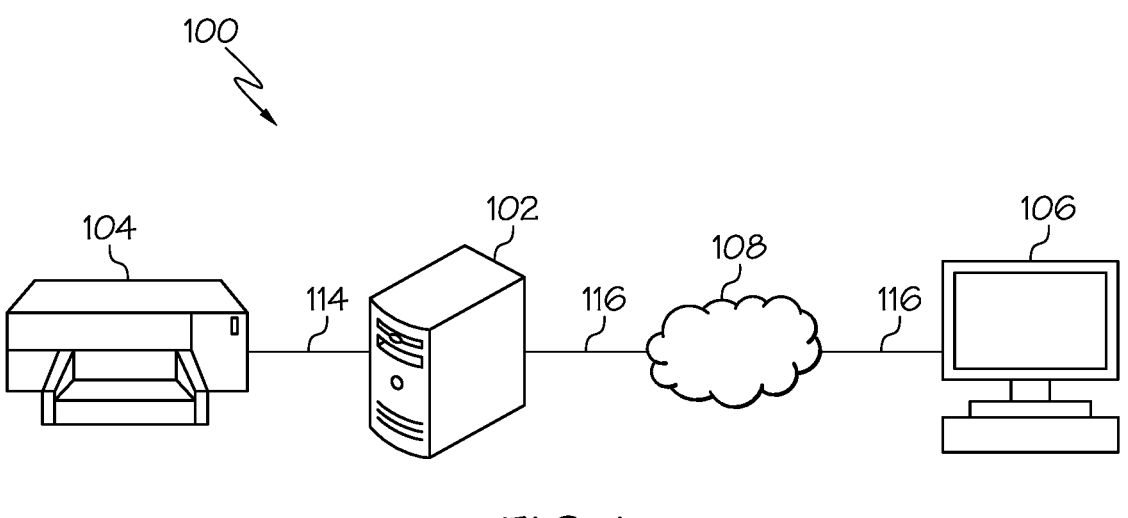
FIG. 1 depicts a printing system, according to one or more embodiments illustrated and described herein.

FIG. 1 depicts a printing system, according to one or more embodiments illustrated and described herein. As shown, a printing system 100 includes a printing device 102, a printer 104 communicatively connected to the printing device 102 via a communication link 114, and a computing terminal 106 communicatively connected to the printing device 102 via a network 108 and respective communication links 116.

Printing device 102 may take the form of any device capable of carrying out the printing-device functions described herein. As such, the printing device 102 could take the form of a server computer, a mainframe, a virtual machine, a workstation, a terminal, a personal computer, or any combination of these or other printing devices. Printing device 102 is described in additional detail below.

Printer 104 may take the form of a three-dimensional (3D) printer and may fabricate an output by, for example, outputting successive layers that collectively form the output. The thickness of a given layer could range, for instance, in the tens of micrometers up to hundreds of micrometers, among other possibilities. Various processes for depositing layers are possible, as will be understood by one of skill in the art. Additional aspects of printer output by a 3D printer are discussed below.

Computing terminal 106 could be a workstation, a terminal, a personal computer, a tablet device, or any combination of these, as just a few examples. The computing terminal 106 may include a keyboard and mouse for receiving input (e.g., from a user) and a display for presenting images or other output to the user. As another possibility, the computing terminal 106 may include a touch display for receiving input from a user and for presenting output to the user. Printing device 102 may receive input and/or provide output via a user interface of computing terminal 106—for instance, by sending instructions to computing terminal 106 to output information sent to the computing terminal 106 from printing device 102 or sending instructions to the computing terminal 106 to provide received information to the printing device 102. Those of skill in the art will appreciate that computing terminal 106 may take other forms as well without departing from the scope of the disclosure.

Network 108 may include one or more computing systems and at least one network infrastructure configured to facilitate transferring data between one or more entities communicatively connected to network 108. The network 108 may include one or more wide-area networks (WANs) and/or local-area networks (LANs), which may be wired and/or wireless networks. In some examples, the network 108 may include the Internet and/or one or more wireless cellular networks, among other possibilities. The network 108 may operate according to one or more communication protocols such as Ethernet, Wi-Fi, internet protocol (IP), transmission control protocol (TCP), long-term evolution (LTE), and the like. Although the network 108 is shown as a single network, it should be understood that the network 108 may include multiple, distinct networks that are themselves communicatively linked. The network 108 could take other forms as well.

Communication link 114 could take the form of a link capable of transferring data between printing device 102 and printer 104. For example, the communication link could take the form of (or include) a serial RS-232 communication link, a USB communication link, a Wi-Fi communication link, and/or an Ethernet communication link, among numerous other possibilities.

Communication links 116 may communicatively link respective entities with network 108 to facilitate communication between entities communicatively connected to the network 108. Any of the communication links 116 may be a combination of hardware and/or software, perhaps operating on one or more communication-link layers such as one or more physical, network, transport, and/or application layers.

Those of skill in the art will appreciate that printing system 100 may include different and/or additional entities. For example, the printing system 100 may include additional printing devices communicatively connected to printer 104, additional three-dimensional printers communicatively connected to printing device 102 and/or other printing devices, or a combination of these. Different and/or additional communication links may be present, such as one or more communication links that connect printer 104 to network 108. In some embodiments, the printing device 102, the printer 104, and/or the computing terminal 106 may be combined into a single printing device. For example, in some embodiments, the printing device 102 and the printer 104 may be combined in a printing device with no connecting link. In some embodiments, the printing device 102 and the computing terminal 106 may be combined into a printing device. In some embodiments, the printing device 102, the printer 104, and the computing terminal 106 may be combined into a single printing device. Other examples are possible as well, as will be understood by those of skill in the art.

Figure 2:
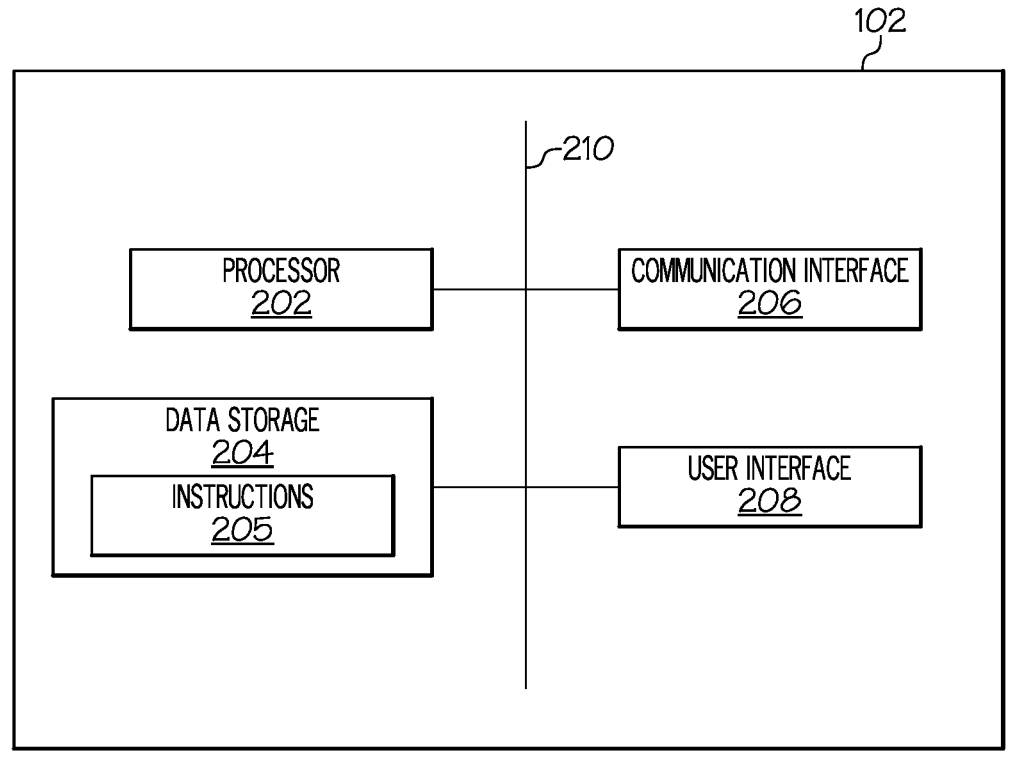
FIG. 2 depicts a block diagram of a printing device, according to one or more embodiments illustrated and described herein.

FIG. 2 depicts a block diagram of the printing device 102, according to one or more embodiments illustrated and described herein. As shown, printing device 102 includes a processor 202, a data storage 204 that has (stores) instructions 205, a communication interface 206, and a user interface 208, each of which are communicatively connected via a system bus 210. It should be understood, however, that printing device 102 may include different and/or additional components. For example, in an embodiment, printing device 102 does not include user interface 208.

Processor 202 may take the form of one or more general-purpose processors and/or one or more special-purpose processors, and may be integrated in whole or in part with data storage 204, communication interface 206, user interface 208, and/or any other component of printing device 102, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database managements system (RDBMS), any other non-volatile storage, or any combination of these, to name just a few examples.

Instructions 205 may be stored in data storage 204, and may include machine-language instructions executable by processor 202 to cause printing device 102 to perform the printing-device functions described herein. Additionally or alternatively, instructions 205 may include script instructions executable by a script interpreter configured to cause processor 202 and printing device 102 to execute the instructions specified in the script instructions. Those having skill in the art will recognize that instructions 205 may take other forms as well, and that other data may be stored in data storage 204.

Communication interface 206 may be any component capable of performing the communication-interface functions described herein. As such, communication interface 206 could take the form of an Ethernet, Wi-Fi, Bluetooth, and/or USB interface, among many other examples. Communication interface 206 may receive data via communication link 114 and/or via communication links 116 over network 108, for instance. As examples, communication interface 206 may facilitate communication between printing device 102 and printer 104 over communication link 114, or may facilitate communication with computing terminal 106 via network 108 over communication links 116.

User interface 208 may be any component capable of carrying out the user-interface functions described herein. For example, the user interface 208 may be configured to receive input from a user and/or output information to the user. User input might be achieved via a keyboard, a mouse, or another component communicatively linked to printing device 102. As another possibility, input may be realized via a touchscreen display of printing device 102. Output to a user may be provided via a computer monitor or a loudspeaker (such as a computer speaker) communicatively linked to printing device 102, as an example. Some components may provide for both input and output, such as the above-mentioned touchscreen display. Those having skill in the art will understand that user interface 208 may take numerous other forms as well.

System bus 210 may be any component capable of performing the system-bus functions described herein. In an embodiment, system bus 210 is any component configured to transfer data between processor 202, data storage 204, communication interface 206, user interface 208, and/or any other component of printing device 102. In an embodiment, system bus 210 includes a traditional bus as is known in the art. In other embodiments, system bus 210 includes a serial RS-232 communication link, a USB communication link, and/or an Ethernet communication link, alone or in combination with a traditional computer bus, among numerous other possibilities. In some examples, system bus 210 may be formed from any medium that is capable of transmitting a signal, such as conductive wires, conductive traces, or optical waveguides, among other possibilities. Those of skill in the art will recognize that system bus 210 may take various other forms as well.

Figure 3:
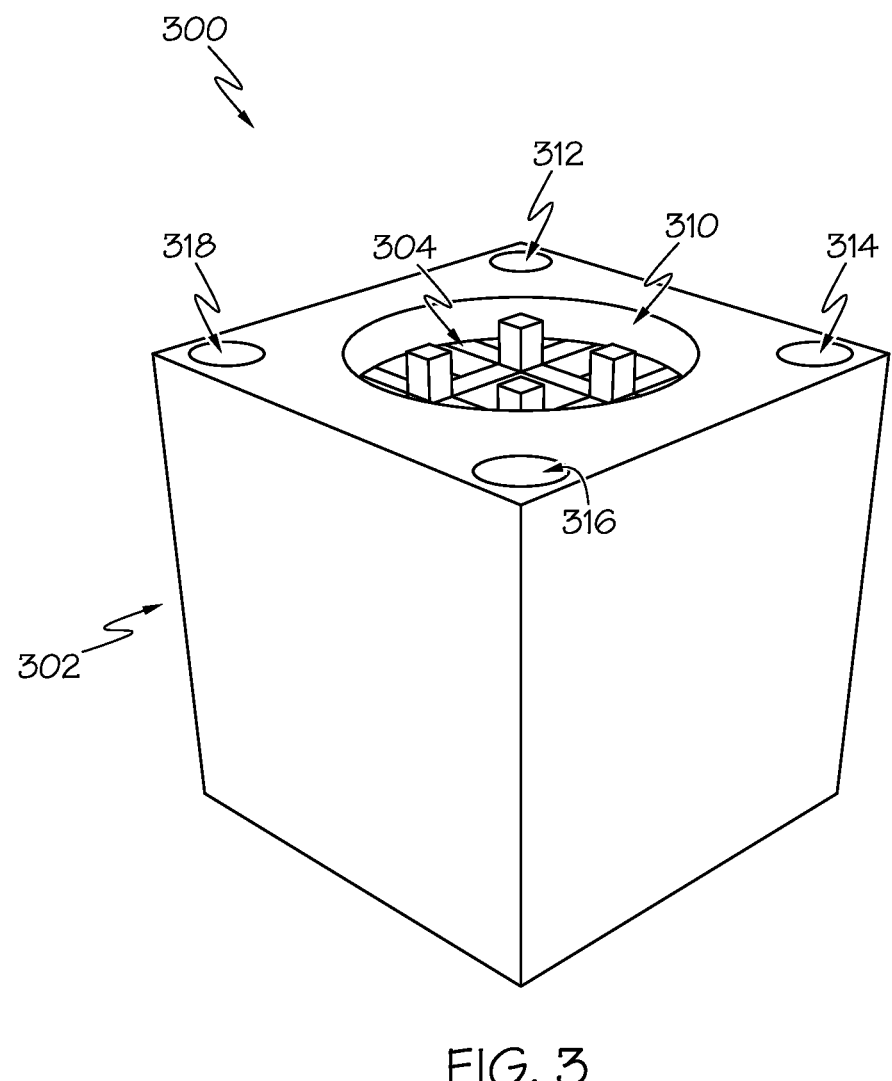
FIG. 3 depicts an example of a printer output, according to one or more embodiments illustrated and described herein.

FIG. 3 depicts an example of a printer output, according to one or more embodiments illustrated and described herein. As shown, a printer output 300 includes a component output 302 and a lattice output 304. It will be appreciated by those of skill in the art that printer output 300 may include different and/or additional outputs, such as outputs different and/or additional components, outputs of different and/or additional lattice support structures, or a combination of these, as examples.

Component output 302 takes the form of an output of a component, such as an air-oil separator or a heat exchanger, among many other possibilities. For simplicity of illustration, component output 302 is shown as an output of a component in the form of a solid cube having a hole 310, a hole 312, a hole 314, a hole 316, and a hole 318. Each of the holes extends from a top surface of the cube to a bottom surface (not shown) of the cube.

Lattice output 304 is an output of a lattice support structure for the component, and may serve to provide additional structural support to the component. In the embodiment of FIG. 3, the lattice support structure is present inside of hole 310, but not inside of holes 312-318, which are smaller than hole 310. These smaller holes may serve to provide air flow and temperature control to the component, and providing a lattice support structure within these smaller holes could obstruct the air flow and prevent proper temperature control.

Printer output 300 may be generated by printing device 102—for instance, via printer 104. In an embodiment, generating the printer output includes printing device 102 sending printing instructions to printer 104 via communication link 114, and the printing instructions cause printer 104 to output the printer output. In other embodiments, printing device 102 and printer 104 are integrated into a single device, and generating the printer output includes printing device 102 outputting the printer output via the integrated printing device. Other examples of generating the printer output are possible as well.

To prevent output of a lattice support structure inside of holes 312-318, a lattice exclusion area may be defined for the component. Printing device 102 may generate the printer output so as to exclude output of the lattice support structure from the lattice exclusion area. Additional examples of a lattice exclusion area are described below.

Figure 4:
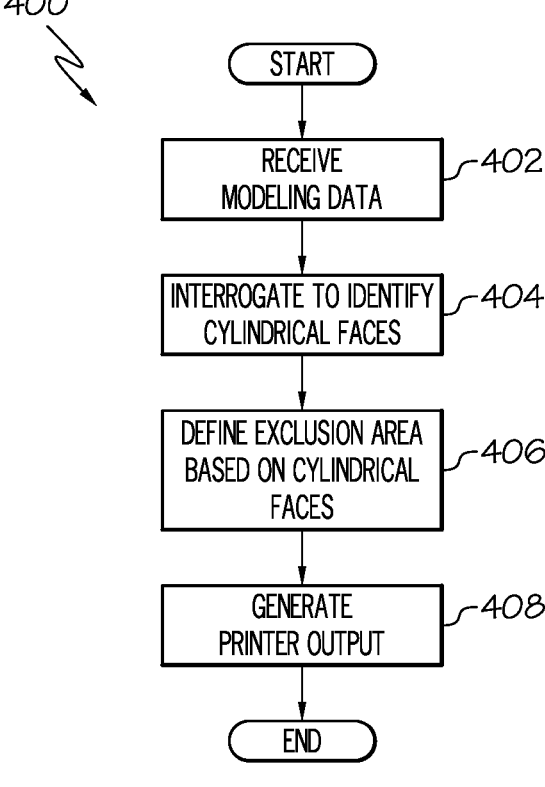
FIG. 4 depicts a flowchart of a method carried out by a printing device, according to one or more embodiments illustrated and described herein.

FIG. 4 depicts a flowchart of a method carried out by a printing device, according to one or more embodiments illustrated and described herein. Though the method is described below as being carried out by printing device 102, it should be understood that the method may be carried out by any entity or combination of entities of printing system 100.

As shown in FIG. 4, a method 400 begins at step 402 with printing device 102 receiving modeling data that defines a three-dimensional (3D) solid model of a component body.

Figure 5:
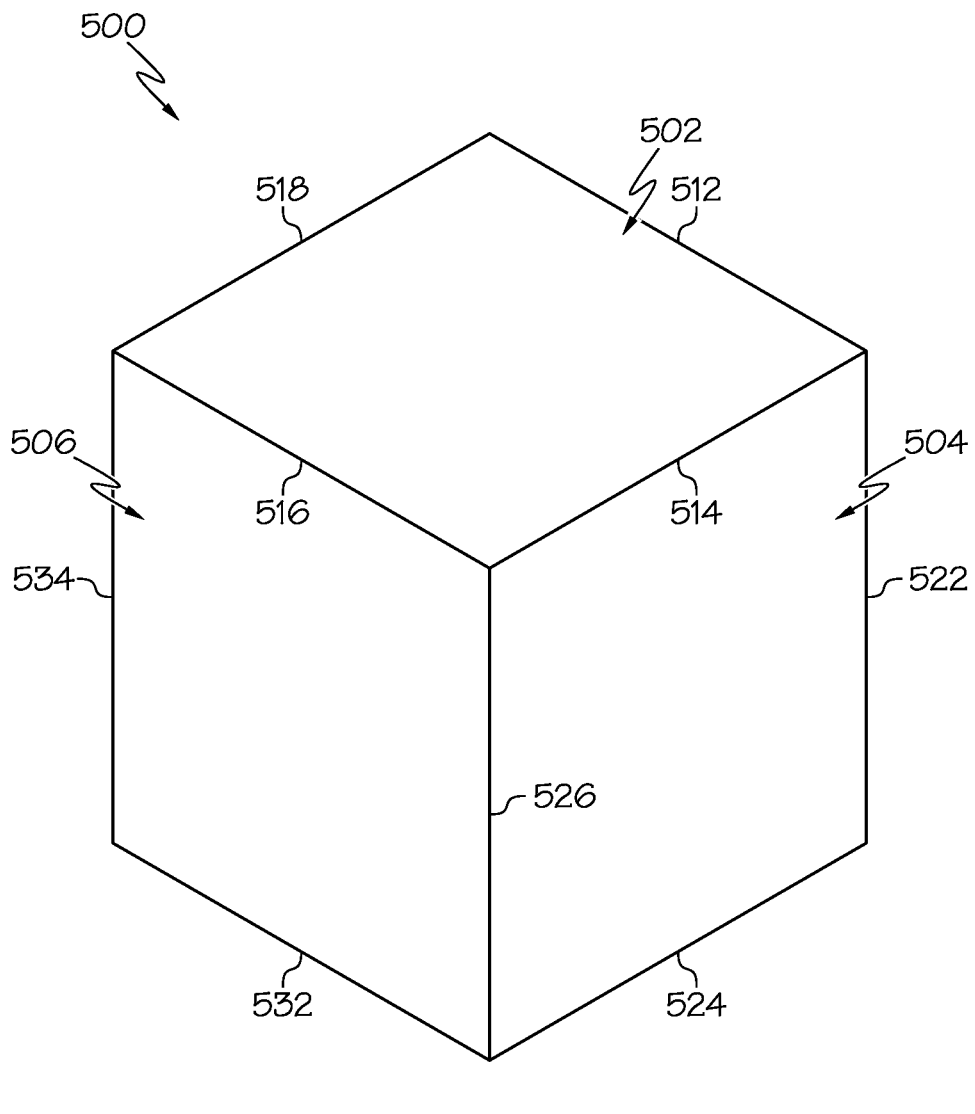
FIG. 5 depicts a solid model of a simplified component body, according to one or more embodiments illustrated and described herein.

FIG. 5 depicts a solid model of a simplified component body, according to one or more embodiments illustrated and described herein. In the illustrated embodiment, a solid model of a component body 500 takes the form of a three-dimensional solid that is enclosed by a closed surface and that has a given volume defined by a boundary of the enclosed three-dimensional solid. For instance, as shown, the solid model of component body 500 takes the form of a solid cube, though it will be appreciated that the solid model could take the form of a solid model having a different geometric shape or combination of geometric shapes. Those of skill in the art will appreciate that that the solid model of component body 500 could take numerous other forms as well without departing from the scope of the claims.

In the embodiment illustrated in FIG. 5, component body 500 has a plurality of faces and a plurality of edges, and each of the faces meets another face of the component body at a respective edge of the component body. For instance, as shown, component body 500 includes a face 502, a face 504, and a face 506, and includes an edge 512, an edge 514, an edge 516, an edge 518, an edge 522, an edge 524, an edge 526, an edge 532, and an edge 534. Face 502 meets face 504 at edge 514—or stated another way, face 504 meets face 502 at edge 514. Additionally, face 502 meets face 506 at edge 516 (i.e., face 506 meets face 502 at edge 516). Also, face 504 meets face 506 at edge 526 (i.e., face 506 meets face 504 at edge 526).

It will be understood by those of skill in the art that component body 500—and specifically, the plurality of faces and the plurality of edges of the component body—may contain additional faces and/or edges. For instance, since the solid model of component body 500 in the illustrated embodiment takes the form of a solid cube, component 500 includes three additional faces not shown in FIG. 5—specifically, an additional face opposite of face 502, an additional face opposite of face 504, and an additional face opposite of face 506—and includes additional edges not shown in FIG. 5.

Figure 6:
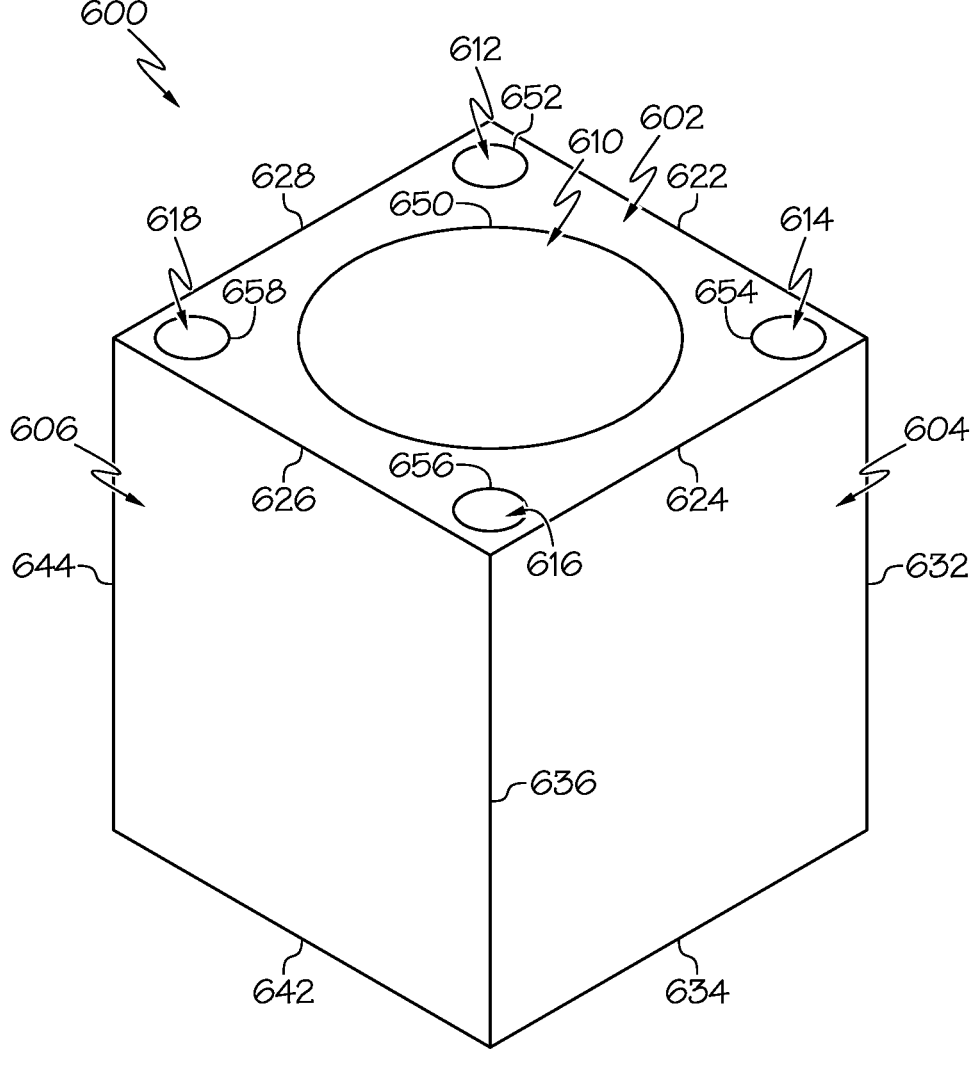
FIG. 6 depicts a solid model of another component body, according to one or more embodiments illustrated and described herein.

FIG. 6 depicts a solid model of another component body, according to one or more embodiments illustrated and described herein. In the illustrated embodiment, a solid model of a component body 600 takes the form of a model of component output 302 shown in FIG. 3. Similar to component body 500, component body 600 has a plurality of faces and a plurality of edges, and each of the faces meets another face of the component body at a respective edge of the component body. For instance, as shown, component body 600 includes a face 602, a face 604, and a face 606, and includes an edge 622, an edge 624, an edge 626, an edge 628, an edge 632, an edge 634, an edge 636, an edge 642, and an edge 644. Face 602 meets face 604 at edge 624—or stated another way, face 604 meets face 602 at edge 624. Additionally, face 602 meets face 606 at edge 626 (i.e., face 606 meets face 602 at edge 626). Also, face 604 meets face 606 at edge 636 (i.e., face 606 meets face 604 at edge 636).

In addition, component body 600 includes a face 610, a face 612, a face 614, a face 616, and a face 618, each of which takes the form of a respective cylindrical face. Component body 600 further includes an edge 650, an edge 652, an edge 654, an edge 656, and an edge 658, and faces 610, 612, 614, 616, and 618 each meet at face 602 at edges 650, 652, 654, 656, and 658, respectively.

Accordingly, at step 402 of FIG. 4, printing device 102 may receive modeling data that defines the solid models shown in FIG. 5, FIG. 6, or both, among other possibilities. The modeling data may include a computer-aided design (CAD) file or other modeling data, as examples. The modeling data could be received from data storage 204, or could be received via communication interface 206—for instance, from computing terminal 106 over network 108 via communication links 116. As another example, the modeling data could be received via a user interface, such as user interface 208 of printing device 102 or a user interface of computing terminal 106, among other possibilities. Those of skill in the art will appreciate that other examples of modeling data (and receiving modeling data) are possible as well without departing from the scope of the claims.

At step 404, printing device 102 interrogates one or more faces of the component body to identify one or more cylindrical faces among the interrogated faces. Interrogating the faces may involve, for each of the interrogated faces, identifying whether the respective face is a cylindrical face. For instance, the printing device may interrogate faces 602-606 and 610-618 of component body 600 to identify one or more cylindrical faces—namely, faces 610-618—among these interrogated faces. It will be understood by those of skill in the art that different and/or additional faces could be interrogated as well (such as one or more faces of component body 600 that are not shown in FIG. 6).

Interrogating faces 602-606 and 610-618 of component body 600 may include interrogating these faces to identify cylindrical faces having respective diameters less than a threshold diameter. In an example, face 610 has a diameter d1, and each of faces 612-618 has a respective diameter d2. As reflected in FIG. 6, the diameter of face 610 is greater than the respective diameters of faces 612-618. Diameter d1 is greater than a threshold diameter dt, and diameter d2 is less than threshold diameter d2.

In this example, printing device 102 interrogates faces 602-606 and 610-618 to identify faces 612-618 (which are cylindrical faces having respective diameters d2 that are less than threshold diameter dt), but not faces 602-606 (which are not cylindrical faces) and not face 610 (which is a cylindrical face but does not have a diameter that is less than the threshold diameter).

Interrogating the one or more faces of component body 600 may include interrogating one of the faces of the component body or interrogating a plurality of faces of the component body. For instance, interrogating the faces of component body 600 may include receiving an indication of one or more faces of the component body, and then interrogating the indicated faces. Printing device 102 may receive an indication of the threshold diameter. The indication of the faces to interrogate, the indication of the threshold diameter, or both of these may be received via a user interface or a communication interface, among other possibilities.

At step 406, printing device 102 defines a lattice exclusion area having a boundary formed based at least in part on the identified cylindrical faces (among the faces interrogated at step 404). In an example, at step 404, printing device 102 identifies faces 612-618—for example, because these faces are cylindrical faces having respective diameters that are less than a threshold diameter—and at step 406, printing device 102 defines a lattice exclusion area having a boundary formed based at least in part on identified faces 612-618.

Figure 7:
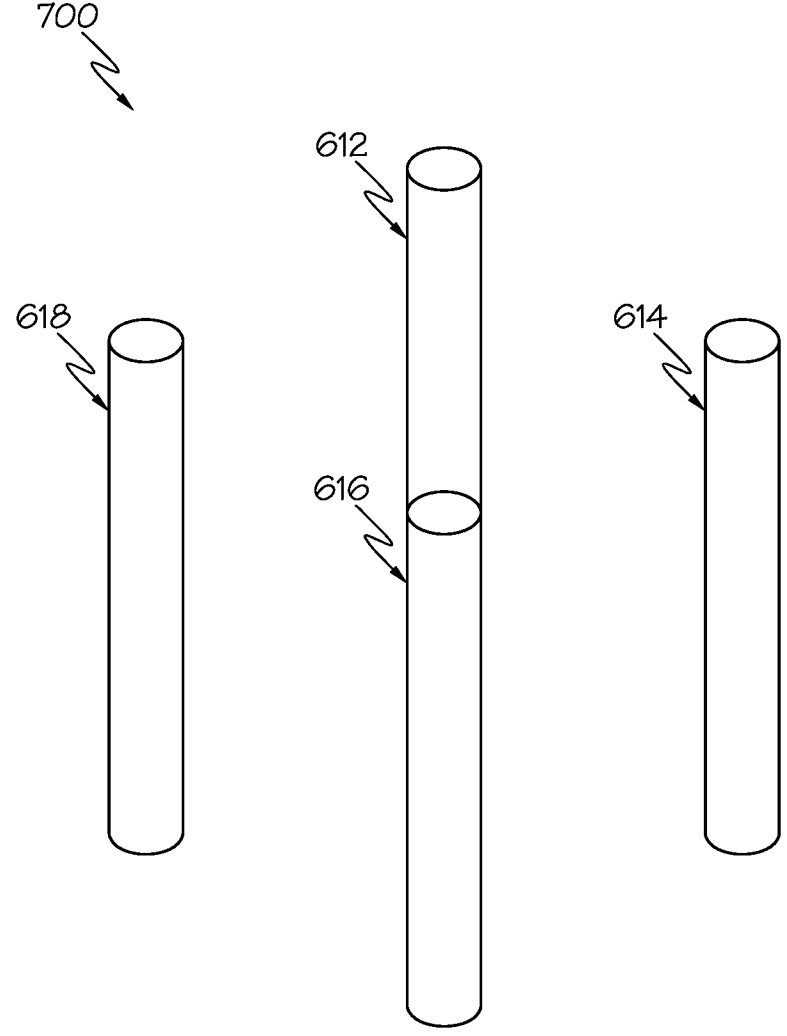
FIG. 7 depicts a lattice exclusion area, according to one or more embodiments illustrated and described herein.

FIG. 7 depicts a lattice exclusion area, according to one or more embodiments illustrated and described herein. As shown, a lattice exclusion area 700 has a boundary formed based on faces 612-618 of component body 600, which in this example are the cylindrical faces of the component body identified at step 404. The lattice exclusion area corresponds to holes 312-318 of component output 302 illustrated in FIG. 3, which as described above, may be used for air flow and temperature control.

In some embodiments, the lattice exclusion area may be further extended—for instance, to create additional empty space to facilitate air flow. For instance, defining the lattice exclusion area may include pulling one or more extreme faces of the lattice exclusion area.

Figure 8:
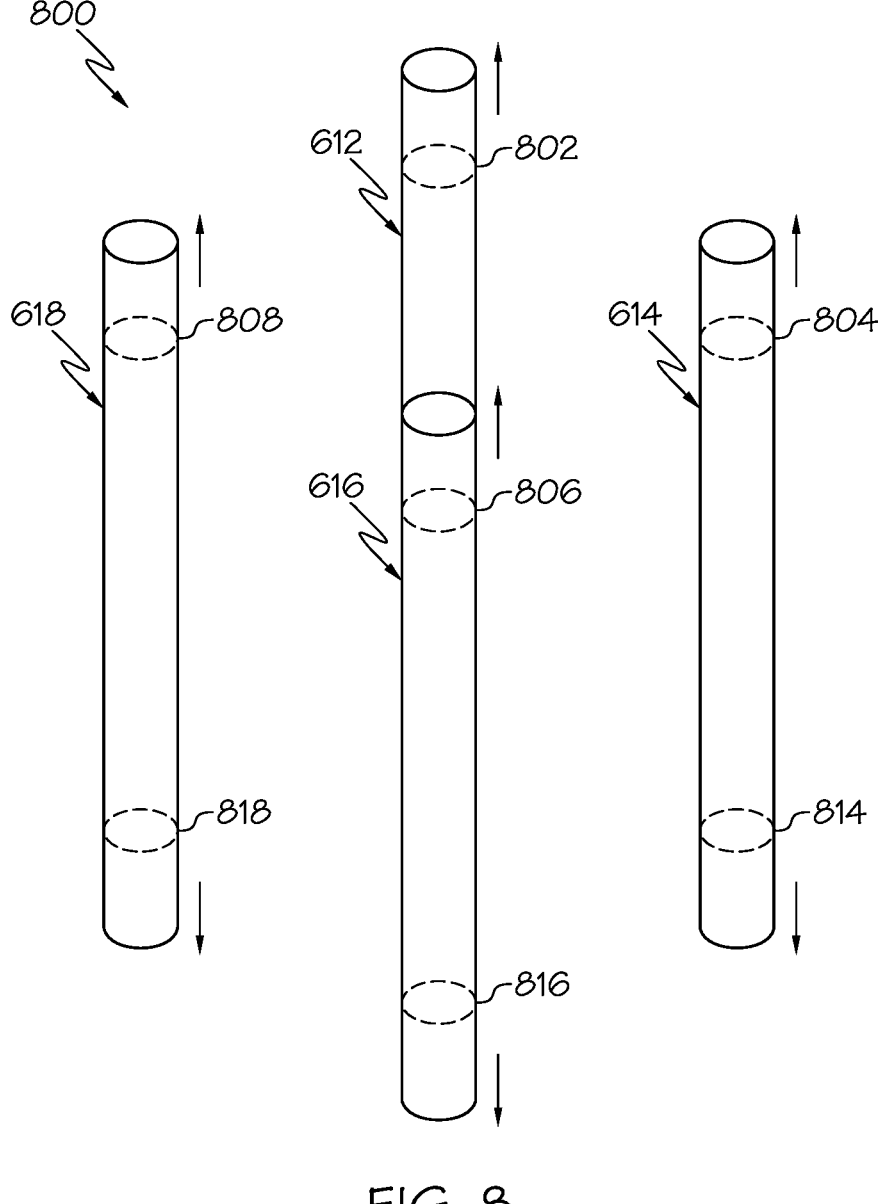
FIG. 8 depicts a lattice exclusion area, according to one or more embodiments illustrated and described herein.

FIG. 8 depicts another lattice exclusion area, according to one or more embodiments illustrated and described herein. In the illustrated embodiment, a lattice exclusion area 800 has a boundary formed based at least in part on faces 602-608 of component body 600. In addition, lattice exclusion area 800 has extreme faces 802, 804, 806, and 808. The lattice exclusion area further includes extreme faces 814, 816, and 818 that are opposite of extreme faces 804, 806, and 808, respectively, and further includes an extreme face (not shown) that is opposite of extreme face 802. As shown in FIG. 8, defining lattice exclusion area 800 includes pulling the extreme faces away from the lattice exclusion area, causing an expansion of the lattice exclusion area. It will be appreciated that the lattice exclusion area could include different and/or additional extreme faces, and that defining the lattice exclusion area could include pulling all or less than all of these extreme faces.

Referring back to FIG. 4, at step 408, printing device 102 generates a printer output of the component body and a lattice support structure for the component body. The printer output of the lattice support structure is outside of the lattice exclusion area.

As an example, the printer output could take the form of printer output 300 illustrated in FIG. 3, which includes component output 302 of a component (such as component body 600) and lattice output 304 of a lattice support structure for the component. Lattice output 304, in turn, could take the form of a lattice support structure that is within a lattice filling area but outside of a lattice exclusion area.

Figure 9A:
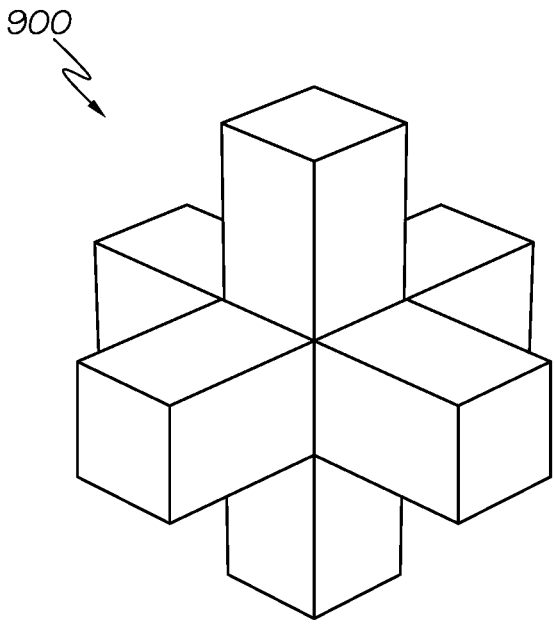
FIG. 9a depicts a lattice unit cell.
Figure 9B:
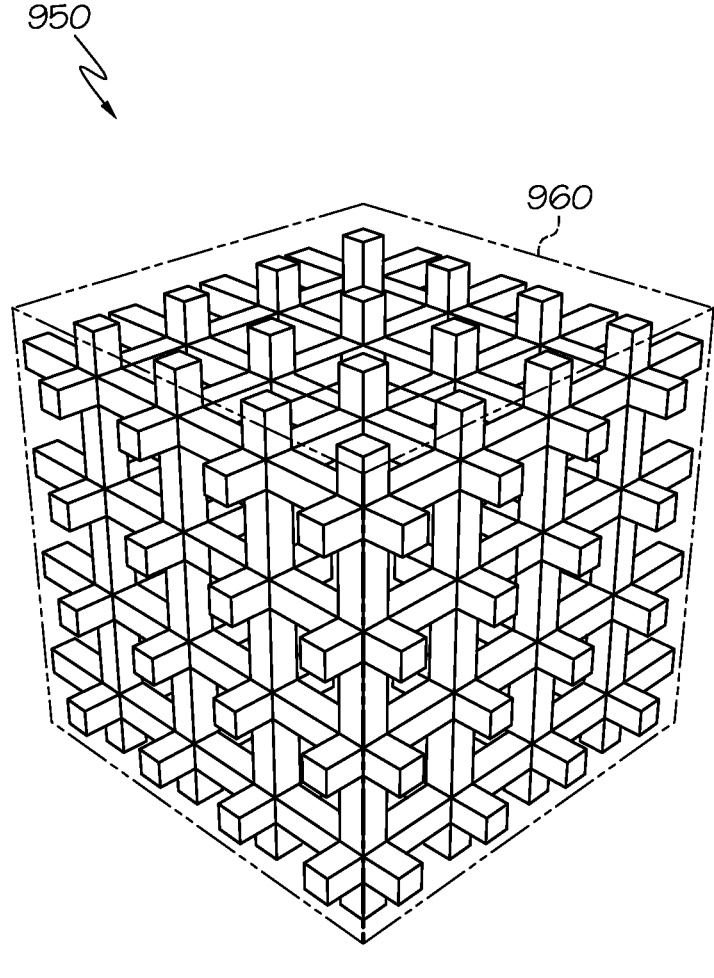
FIG. 9b depicts a tiling of the lattice unit cell, according to one or more embodiments illustrated and described herein.

FIG. 9a depicts a lattice unit cell, and FIG. 9b depicts a tiling of the lattice unit cell, according to one or more embodiments illustrated and described herein. As shown in FIG. 9a, a lattice unit cell 900 takes the form of a cubic space having a solid model of a geometric shape, and as shown in FIG. 9b, a tiling 950 of lattice unit cell 900 includes a plurality of tiles of the lattice unit cell that collectively form a cubic honeycomb. In some embodiments, the lattice unit cell could take the form of any parallelepiped (e.g., a three-dimensional polygon such as a cuboid) and the tiling could take the form of any honeycomb (e.g., a cubic honeycomb). Also shown in FIG. 9b is a boundary of a lattice filling area 960; tiling 950 takes the form of a tiling of lattice unit cell 900 within the lattice filling area (i.e., within the boundary of the lattice filling area). It should be noted that FIG. 9b does not depict or account for a lattice exclusion area.

In an embodiment, lattice output 304 takes the form of a tiling lattice unit cell 900. The tiling is within lattice filling area 960, but outside of lattice exclusion area 700. In one such embodiment, the printer output of the lattice support structure is outside of the lattice exclusion area subsequent to the pulling of the extreme faces of the lattice exclusion area. For instance, the output of the lattice support structure may take the form of a tiling of a lattice unit cell within a lattice filling area but outside of a lattice exclusion area subsequent to the pulling of the extreme faces of the lattice exclusion area.

By generating a printer output of a lattice support structure that is outside of the lattice exclusion area, it may be possible to prevent the lattice support structure from blocking areas such as air passageways, formed by the cylindrical faces, that may function to provide temperate control are thus intended to remain clear of obstructions.

Though the above described approach may allow for defining a lattice exclusion area with respect to cylindrical holes of a component, not all air openings through a solid body necessarily take the form of cylindrical holes. Described below is an approach that may allow for defining a lattice exclusion area with respect to non-cylindrical openings through a solid body.

Figure 10A:
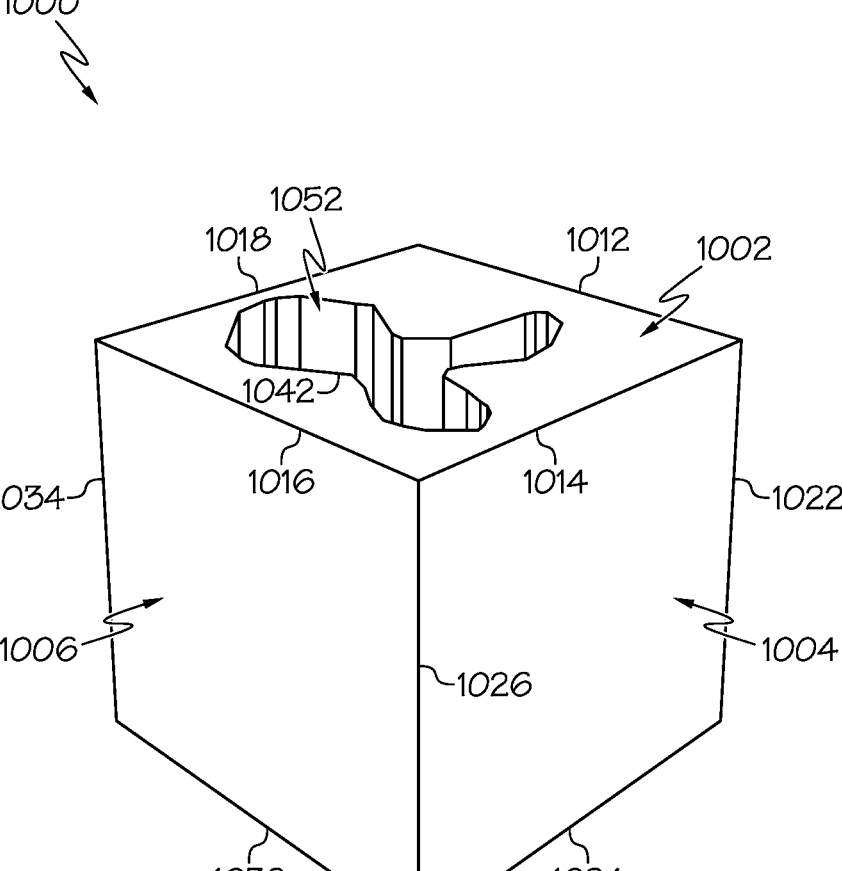
FIG. 10a and FIG. 10b depict respective views of a solid model of a component body, according to one or more embodiments illustrated and described herein.
Figure 10B:
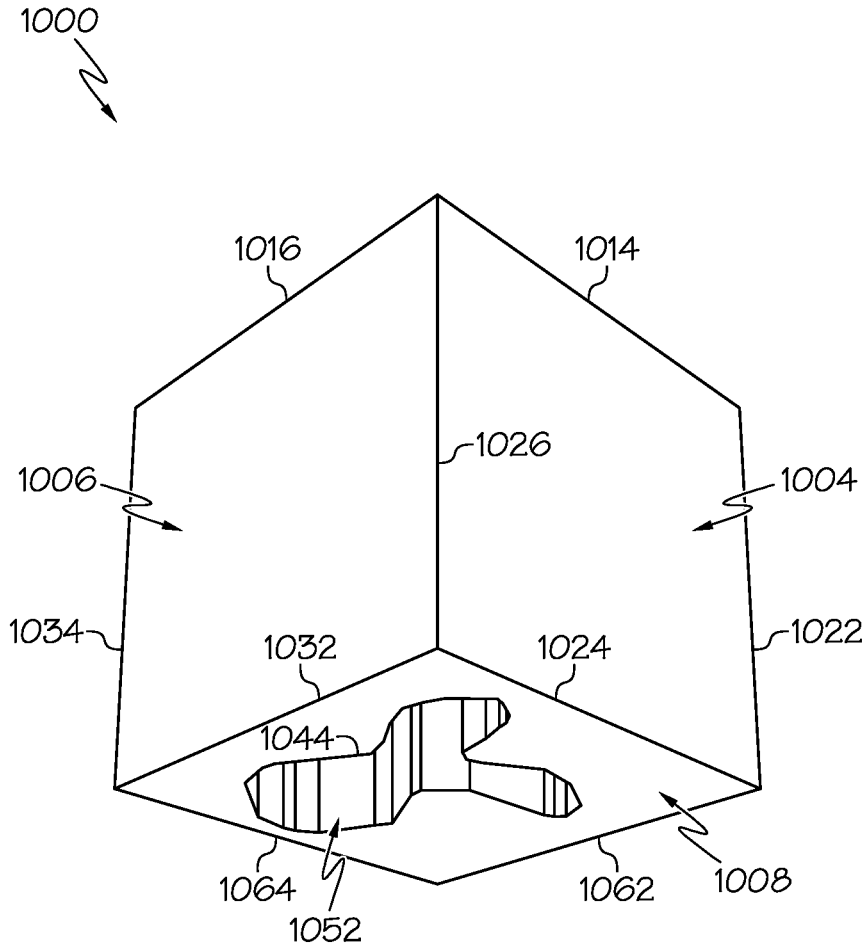

FIG. 10a and FIG. 10b depict respective views of a solid model of a component body, according to one or more embodiments illustrated and described herein. As shown in FIG. 10a, a component body 1000 has a plurality of faces and a plurality of edges, and each of the faces meets another face of the component body at a respective edge of the component body. In the illustrated embodiment, component body 1000 includes a face 1002, a face 1004, and a face 1006, and includes an edge 1012, an edge 1014, an edge 1016, an edge 1018, an edge 1022, an edge 1024, an edge 1026, an edge 1032, and an edge 1034. Face 1002 meets face 1004 at edge 1014—or stated another way, face 1004 meets face 1002 at edge 1014. Also, face 1002 meets face 1006 at edge 1016 (i.e., face 1006 meets face 1002 at edge 1016). Further, face 1004 meets face 1006 at edge 1026 (i.e., face 1006 meets face 1004 at edge 1026). In addition, component body 100 includes an edge 1042 and a face 1052 that meets face 1002 at edge 1042.

As shown in FIG. 10b, component body 1000 further includes a face 1008, an edge 1044, an edge 1062, and an edge 1064. Face 1008 meets face 1004 at edge 1024, meets face 1006 at edge 1032, and meets face 1052 at edge 1044.

Figure 11:
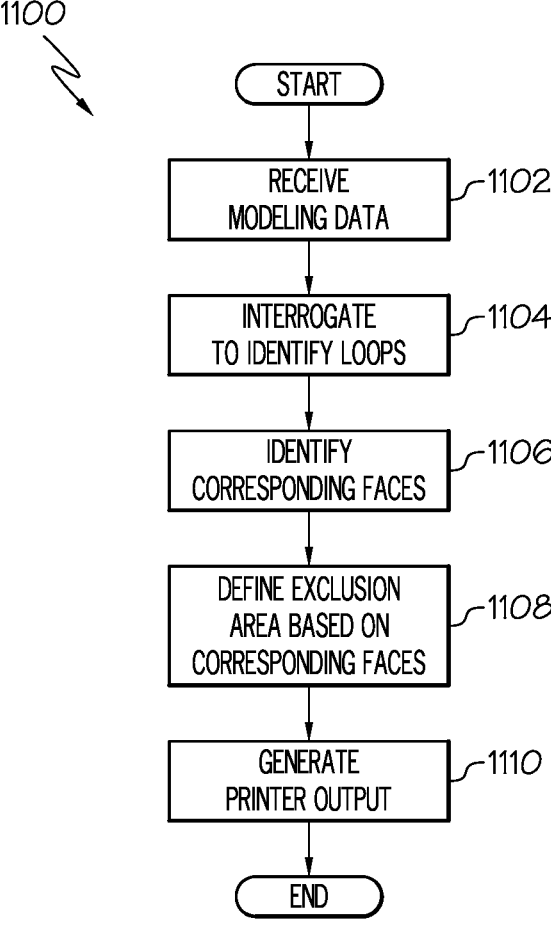
FIG. 11 depicts a flowchart of a method carried out by a printing device, according to one or more embodiments illustrated and described herein.

FIG. 11 depicts a flowchart of a method carried out by a printing device, according to one or more embodiments illustrated and described herein. Though the method is described below as being carried out by printing device 102, it should be understood that the method may be carried out by any entity or combination of entities of printing system 100.

As shown in FIG. 11, a method 1100 begins at step 1102 with printing device 102 receiving modeling data that defines a 3D solid model of component body 1000. Receiving the modeling data may take a form similar to that described above with respect to step 402 of method 400 illustrated in FIG. 4. For instance, modeling data defining the 3D model of component body 1000 may take the form of (or include) a computer-aided design (CAD) file or other modeling data, as examples. The modeling data could be received from data storage 204, or could be received via communication interface 206—for instance, from computing terminal 106 over network 108 via communication links 116. As another example, the modeling data could be received via a user interface, such as user interface 208 of printing device 102 or a user interface of computing terminal 106, among other possibilities. Those of skill in the art will appreciate that other examples of modeling data (and receiving modeling data) are possible as well without departing from the scope of the claims.

At step 1104, printing device 102 interrogates one or more faces of the component body 1000 to identify one or more loops. Each of the loops includes one or more respective edges of component body 1000. For instance, as shown in FIG. 10a, edge 1042 forms a loop in face 1002, and as shown in FIG. 10b, edge 1044 forms a loop in face 1008. Other examples of loops could include edges in face 1002 (or another face) that form a polygon such as a triangle or square. A further example of a loop is a circle, such as edge 650 in face 602 of component body 600. Other examples of loops are possible as well.

Interrogating the faces at step 1104 may involve, for each of the interrogated faces, identifying one or more loops in the respective faces. For instance, the printing device may interrogate faces 1002-1008 and 1052 of component body 1000 to identify one or more loops— namely, edges 1042 and 1044—in the interrogated faces. It will be understood by those of skill in the art that different and/or additional faces could be interrogated as well (such as one or more faces of component body 1000 that are not shown in FIGS. 10a and 10b).

At step 1106, printing device 102 identifies one or more faces that correspond to the loops identified at step 1004. As an example, as shown in FIG. 10a, face 1052 corresponds to loop 1042, and as shown in FIG. 10b, face 1052 corresponds to loop 1044. Other examples may include multiple faces that correspond to a given loop having multiple edges. For instance, a loop that includes three edges (in the form of a triangle) may include three corresponding faces, with each of the corresponding faces meeting a given interrogated face that includes the loop, and specifically meeting the given interrogated faces at a respective edge of the triangle.

At step 1108, printing device 102 defines a lattice exclusion area having a boundary formed based at least in part on the corresponding faces identified at step 1106.

Figure 12:
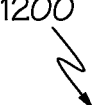
FIG. 12 depicts a lattice exclusion area, according to one or more embodiments illustrated and described herein.
Figure 12:
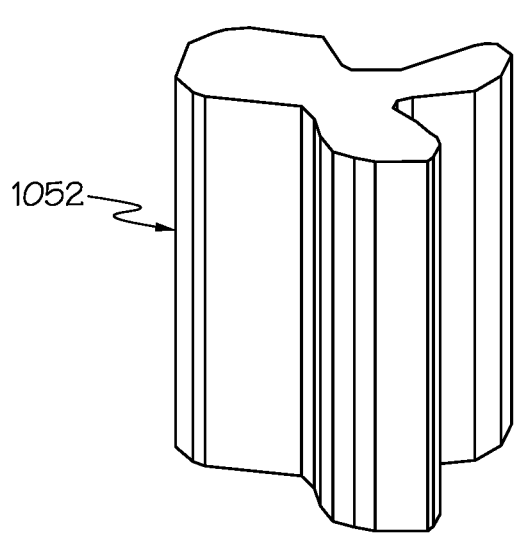

FIG. 12 depicts a lattice exclusion area, according to one or more embodiments illustrated and described herein. As shown, a lattice exclusion area 1200 has a boundary formed based on face 1052 of component body 1000, which in this example is the corresponding face of the component body identified at step 1106.

Figure 13:
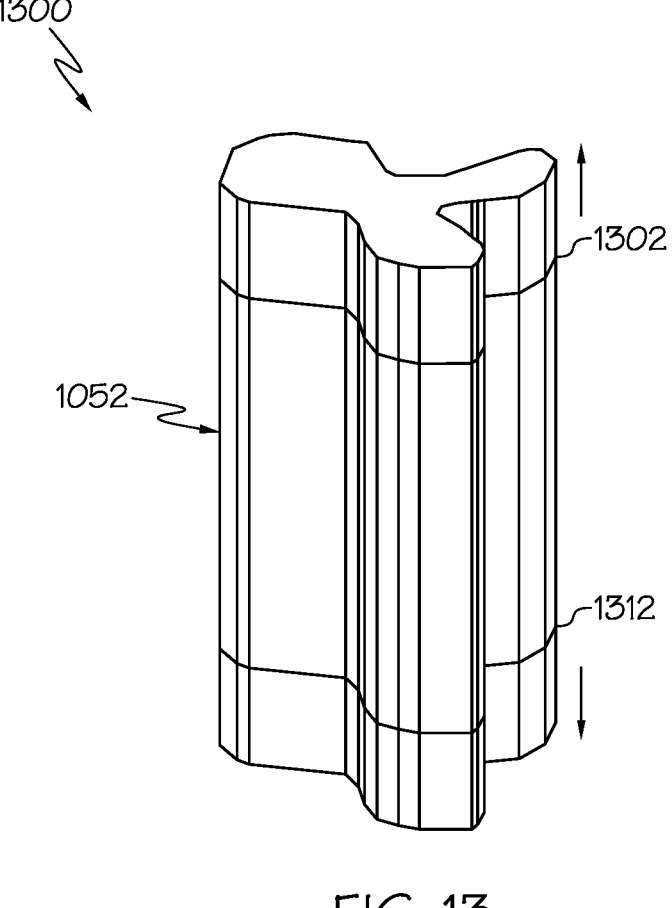
FIG. 13 depicts another lattice exclusion area, according to one or more embodiments illustrated and described herein.

FIG. 13 depicts another lattice exclusion area, according to one or more embodiments illustrated and described herein. In some embodiments, a lattice exclusion area may be further extended, perhaps to create additional empty space to facilitate air flow as described previously. For instance, defining the lattice exclusion area may include pulling one or more extreme faces of the lattice exclusion area. In the embodiment shown in FIG. 13, a lattice exclusion area 1300 has a boundary formed based on face 1052 of component body 1000, which (as in the embodiment of FIG. 12) is the corresponding face of the component body identified at step 1106.

The lattice exclusion area further includes extreme face 1302 and an extreme face 1312 opposite of extreme face 1302. As shown, defining lattice exclusion area 1300 includes pulling extreme faces 1302 and 1312 away from the lattice exclusion area, causing an expansion of the lattice exclusion area. Though the example in FIG. 13 depicts pulling of both extreme faces 1302 and 1312, it will be appreciated that defining the lattice exclusion area could include pulling extreme face 1302 but not extreme face 1312, or could include pulling extreme face 1312 but not extreme face 1302. Additionally, the lattice exclusion area could take other forms as well—for example, if different and/or additional corresponding faces are identified at step 1106.

At step 1110, printing device 102 generates a printer output of component body 1000 and a lattice support structure for the component body. The printer output of the lattice support structure is outside of the lattice exclusion area.

Figure 14:
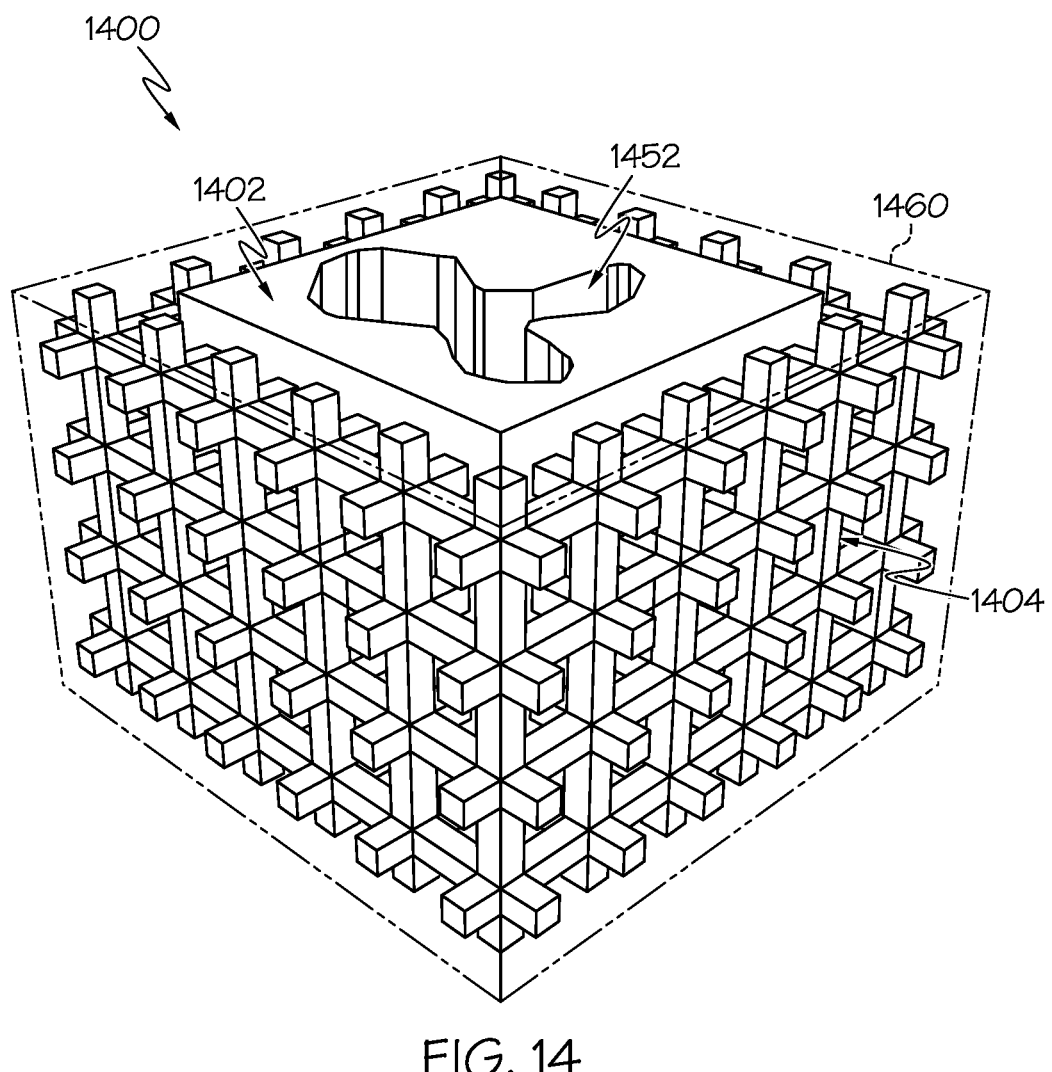
FIG. 14 depicts an example of a printer output, according to one or more embodiments illustrated and described herein.

FIG. 14 depicts an example of a printer output, according to one or more embodiments illustrated and described herein. As shown, a printer output 1400 includes a component output 1402 and a lattice output 1404. It will be appreciated by those of skill in the art that printer output 1400 may include different and/or additional outputs, such as outputs different and/or additional components, outputs of different and/or additional lattice support structures, or a combination of these, as examples.

Component output 1402 takes the form of an output of component body 1000. In the illustrated embodiment, the component output includes an opening 1452 that extends from a top surface of the component output to a bottom surface (not shown) of the component output. The opening is associated with face 1052 that corresponds to edges 1042 and 1044, both of which are loops.

Lattice output 1404 is an output of a lattice support structure for the component. The lattice output is outside of a lattice exclusion area (such as lattice exclusion area 1200 or lattice exclusion area 1300). For instance, as shown in FIG. 14, the lattice support structure is not present inside of opening 1452, since the opening could serve to provide air flow and temperature control to the component and since providing a lattice support structure within the opening could obstruct the air flow and prevent proper temperature control.

In an embodiment, lattice output 1404 takes the form of a lattice support structure that is within a lattice filling area but outside of a lattice exclusion area. For instance, in the embodiment of FIG. 14, the lattice output structure takes the form of a tiling of lattice unit cell 900 (depicted in FIG. 9a) within a lattice filling area 1460 illustrated in FIG. 14, but outside of lattice exclusion area 1300 (depicted in FIG. 13). Additional details regarding the tiling of a lattice unit cell are provided above with reference to FIG. 9b.

By generating a printer output of a lattice support structure that is outside of the lattice exclusion area, it may be possible to prevent the lattice support structure from blocking areas such as air passageways, formed by the faces corresponding to the identified loops, that may function to provide temperate control are thus intended to remain clear of obstructions.

Figure 15:
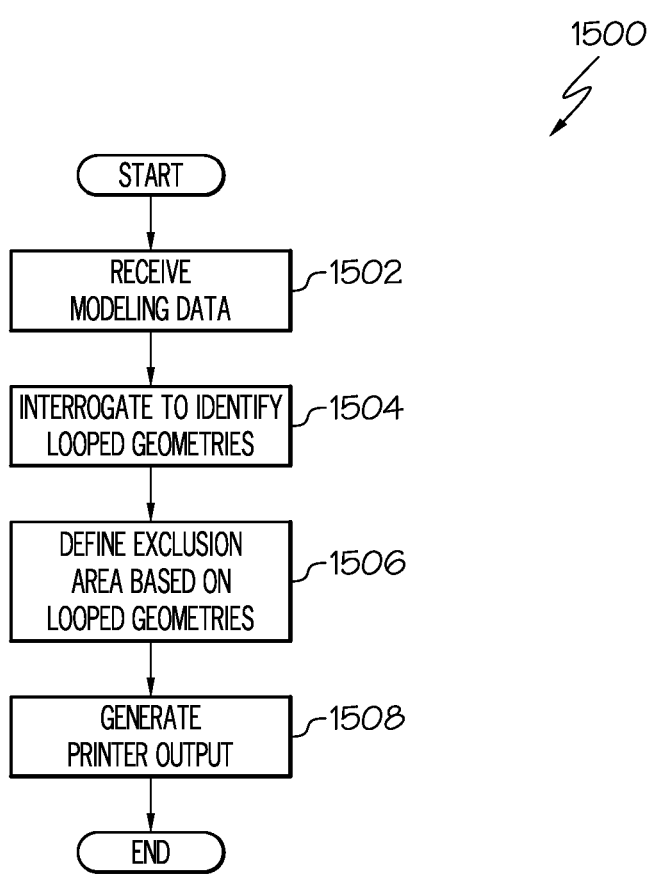
FIG. 15 depicts a flowchart of a method carried out by a printing device, according to one or more embodiments illustrated and described herein.

FIG. 15 depicts a flowchart of a method carried out by a printing device, according to one or more embodiments illustrated and described herein. Though the method is described below as being carried out by printing device 102, it should be understood that the method may be carried out by any entity or combination of entities of printing system 100.

As shown in FIG. 15, a method 1500 begins at step 1502 with printing device 102 receiving modeling data that defines a 3D solid model of a component body, such as component body 600 or component body 1000. Receiving the modeling data may take a form similar to that described above with respect to step 402 of method 400 and/or step 1102 of method 1100.

At step 1504, printing device 102 interrogates one or more faces of the component body to identify one or more looped geometries, and at step 1506, the printing device defines a lattice exclusion area having a boundary formed based at least in part on one or more faces of the component body that correspond to the looped geometries.

In an embodiment, the looped geometries take the form of respective cylindrical faces among the interrogated faces, and the faces that correspond to the looped geometries take the form of the cylindrical faces. Examples of interrogating the faces to identify one or more cylindrical faces are described above with reference to step 404 of method 400, and examples of defining a lattice exclusion area having a boundary formed based (at least in part) on the identified cylindrical faces are described above with reference to step 406 of method 400. In some embodiments, interrogating the faces of the component body includes interrogating the faces to identify cylindrical faces that are among the interrogated faces and that have respective diameters less than a threshold diameter. In such embodiments, the looped geometries may take the form of the cylindrical faces that are among the interrogated faces and that have respective diameters less than a threshold diameter In another embodiment, the looped geometries take the form of one or more loops, and each of the loops includes one or more respective edges of the component body. In such an embodiment, the faces that correspond to the looped geometries include one or more faces that correspond to the loops. Examples of interrogating the faces to identify loops are described above with reference to step 1104, and examples of identifying faces that correspond to the loops are described above with reference to step 1106. In addition, examples of defining a lattice exclusion area having a boundary formed based at least in part on the corresponding faces are provided above with reference to step 1108.

At step 1508, printing device 102 generates a printer output of the component body and a lattice support structure for the component body. The printer output of the lattice support structure is outside of the lattice exclusion area. Generating the printer output may take a form similar to that described above with respect to step 408 of method 400 and/or step 1110 of method 1100. By generating a printer output of a lattice support structure that is outside of the lattice exclusion area, it may be possible to prevent the lattice support structure from blocking areas such as air passageways, formed by the looped geometries, that may function to provide temperate control are thus intended to remain clear of obstructions.

It should now be understood that that systems, printing devices, and method described herein generate a printer output of a lattice support structure that is outside of a lattice exclusion area. The lattice exclusion area may therefore prevent output of a lattice support structure in or near a hole or other opening that could function to promote air flow through the component and regulate a temperate of the component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A method is carried out by a printing device. The method comprises receiving modeling data that defines a three-dimensional solid model of a component body having a plurality of faces and a plurality of edges. Each of the faces meets another face of the component body at a respective edge of the component body. The method further comprises interrogating one or more faces of the component body to identify one or more looped geometries; and defining a lattice exclusion area having a boundary formed based at least in part on one or more faces of the component body that correspond to the looped geometries. The method further includes generating a printer output of the component body and a lattice support structure for the component body. The printer output of the lattice support structure is outside of the lattice exclusion area.

The method of any preceding clause, wherein: the looped geometries comprise respective cylindrical faces among the interrogated faces, and the faces that correspond to the looped geometries comprise the cylindrical faces.

The method of any preceding clause, wherein: interrogating the faces of the component body comprises interrogating the faces to identify cylindrical faces that are among the interrogated faces and that have respective diameters less than a threshold diameter, and the looped geometries comprise the cylindrical faces that are among the interrogated faces and that have respective diameters less than the threshold diameter.

The method of any preceding clause, wherein interrogating the faces comprises: receiving an indication of one or more faces of the component body via a user interface; and interrogating the indicated faces to identify one or more cylindrical faces among the indicated faces.

The method of any preceding clause, wherein: the looped geometries comprise one or more loops, each of the loops comprising one or more respective edges of the component body, and the faces that correspond to the looped geometries comprise one or more faces that correspond to the loops.

The method of any preceding clause, wherein interrogating the faces comprises: receiving an indication of one or more faces of the component body via a user interface; and interrogating the indicated faces to identify one or more loops in the indicated faces.

The method of any preceding clause, wherein: defining the lattice exclusion area comprises pulling one or more extreme faces of the lattice exclusion area, and the printer output of the lattice support structure is outside of the lattice exclusion area subsequent to the pulling of the extreme faces.

The method of any preceding clause, wherein the printer output of the lattice support structure is within a lattice filling area but outside of the lattice exclusion area.

A method is carried out by a printing device. The method comprises receiving modeling data that defines a three-dimensional solid model of a component body having a plurality of faces and a plurality of edges. Each of the faces meets another face of the component body at a respective edge of the component body. The method further comprises interrogating one or more faces of the component body to identify one or more loops. Each of the loops comprises one or more respective edges of the component body. The method further comprises identifying one or more faces of the component body that correspond to the identified loops; and defining a lattice exclusion area having a boundary formed based at least in part on the identified corresponding faces. The method further includes generating a printer output of the component body and a lattice support structure for the component body. The printer output of the lattice support structure is outside of the lattice exclusion area.

The method of any preceding clause, wherein: defining the lattice exclusion area comprises pulling one or more extreme faces of the lattice exclusion area, and the printer output of the lattice support structure is outside of the lattice exclusion area subsequent to the pulling of the extreme faces.

The method of any preceding clause, wherein the printer output of the lattice support structure is within a lattice filling area but outside of the lattice exclusion area.

The method of any preceding clause, wherein the printer output of the lattice support structure comprises a tiling of a lattice unit cell within the lattice filling area but outside of the lattice exclusion area.

The method of any preceding clause, wherein interrogating the faces comprises: receiving an indication of one or more faces of the component body via a user interface; and interrogating the indicated faces to identify one or more loops in the interrogated faces.

The method of any preceding clause, wherein the printer output of the lattice support structure comprises a tiling of a lattice unit cell within the lattice filling area but outside of the lattice exclusion area.

What is claimed is:

1. A method carried out by a printing device, the method comprising:

receiving modeling data that defines a three-dimensional solid model of a component body having a plurality of faces and a plurality of edges, each of the faces meeting another face of the component body at a respective edge of the component body;

interrogating faces of the component body to identify a first looped geometry on a first face of the faces of the component body and a second looped geometry on a second face of the faces of the component body;

defining a lattice exclusion area having a boundary formed based on the first face and the second face of the component body that correspond to the first looped geometry and the second looped geometry, wherein the boundary extends from the first looped geometry on the first face to the second looped geometry on the second face, and the lattice exclusion area defines a space where a lattice support structure is excluded thereby preventing the lattice support structure from blocking areas formed by the boundary extending between the first looped geometry and the second looped geometry; and generating a printer output of the component body and the lattice support structure for the component body, the printer output of the lattice support structure being outside of the lattice exclusion area.

2. The method of claim 1, wherein:

the first looped geometry or the second looped geometry comprise respective cylindrical faces among the interrogated faces, and the faces that correspond to the first looped geometry or the second looped geometry comprise the cylindrical faces.

3. The method of claim 2, wherein:

interrogating the faces of the component body comprises interrogating the faces to identify cylindrical faces that are among the interrogated faces and that have respective diameters less than a threshold diameter, and the first looped geometry or the second looped geometry comprise the cylindrical faces that are among the interrogated faces and that have respective diameters less than the threshold diameter.

4. The method of claim 2, wherein interrogating the faces comprises:

receiving an indication of the faces of the component body via a user interface; and interrogating the indicated faces to identify one or more cylindrical faces among the indicated faces.

5. The method of claim 1, wherein:

the first looped geometry or the second looped geometry comprise one or more loops, each of the loops comprising one or more respective edges of the component body, and the faces that correspond to the first looped geometry or the second looped geometry comprise one or more faces that correspond to the loops.

6. The method of claim 5, wherein interrogating the faces comprises:

receiving an indication of the faces of the component body via a user interface; and interrogating the indicated faces to identify one or more loops in the indicated faces.

7. The method of claim 1, wherein:

defining the lattice exclusion area comprises pulling one or more extreme faces of the lattice exclusion area, and the printer output of the lattice support structure is outside of the lattice exclusion area subsequent to the pulling of the one or more extreme faces.

8. The method of claim 1, wherein the printer output of the lattice support structure is within a lattice filling area but outside of the lattice exclusion area.

9. The method of claim 8, wherein the printer output of the lattice support structure comprises a tiling of a lattice unit cell within the lattice filling area but outside of the lattice exclusion area.

10. A method carried out by a printing device, the method comprising:

receiving modeling data that defines a three-dimensional solid model of a component body having a plurality of faces and a plurality of edges, each of the faces meeting another face of the component body at a respective edge of the component body;

interrogating faces of the component body to identify a first loop on a first face of the faces of the component body and a second loop on a second face of the faces of the component body, each of the first loop and the second loop comprise one or more respective edges of the component body;

identifying one or more faces of the component body that correspond to the identified first loop and the identified second loop;

defining a lattice exclusion area having a boundary formed based on the first face and the second face of the component body that correspond to the first loop and the second loop, wherein the boundary extends from the first loop on the first face to the second loop on the second face, and the lattice exclusion area defines a space where a lattice support structure is excluded thereby preventing the lattice support structure from blocking areas formed by the boundary extending between the first loop and the second loop; and generating a printer output of the component body and the lattice support structure for the component body, the printer output of the lattice support structure being outside of the lattice exclusion area.

11. The method of claim 10, wherein:

defining the lattice exclusion area comprises pulling one or more extreme faces of the lattice exclusion area, and the printer output of the lattice support structure is outside of the lattice exclusion area subsequent to the pulling of the one or more extreme faces.

12. The method of claim 10, wherein the printer output of the lattice support structure is within a lattice filling area but outside of the lattice exclusion area.

13. The method of claim 12, wherein the printer output of the lattice support structure comprises a tiling of a lattice unit cell within the lattice filling area but outside of the lattice exclusion area.

14. The method of claim 10, wherein interrogating the faces comprises:

receiving an indication of the faces of the component body via a user interface; and interrogating the indicated faces to identify one or more loops in the interrogated faces.

* * * * *